June 15, 1965     A. F. SULLIVAN     3,189,151
TORQUE TRANSMITTING MEANS

Filed July 3, 1961     2 Sheets-Sheet 1

ARTHUR F. SULLIVAN
*INVENTOR.*

BY John R. Faulkner
Thomas H. Oster

ATTORNEYS

3,189,151
TORQUE TRANSMITTING MEANS
Arthur F. Sullivan, Southgate, Mich., assignor to Ford Motor Company, Dearborn, Mich., a corporation of Delaware
Filed July 3, 1961, Ser. No. 121,735
7 Claims. (Cl. 192—85)

This invention relates generally to a means for selectively transmitting torque between a driving member and a driven member. In particular the invention relates to a fluid actuated clutch.

Broadly speaking, the clutch consists of a driving member and a driven member. One of the members has a flexible portion or diaphragm which defines an expansible fluid chamber. A clutch disc is located within the expansible chamber and is connected to and part of the other of the members.

Upon evacuation of fluid from the expansible chamber, atmospheric pressure causes a collapse or inward flexing of the flexible portion. This inward flexing movement is sufficient to cause the flexible portion to clamp the clutch disc between the flexible portion and the member to which it is attached. The driving torque is then transmitted from the driving member to the driven member. Torque will be transmitted as long as the expansible chamber remains evacuated.

Figure 1:
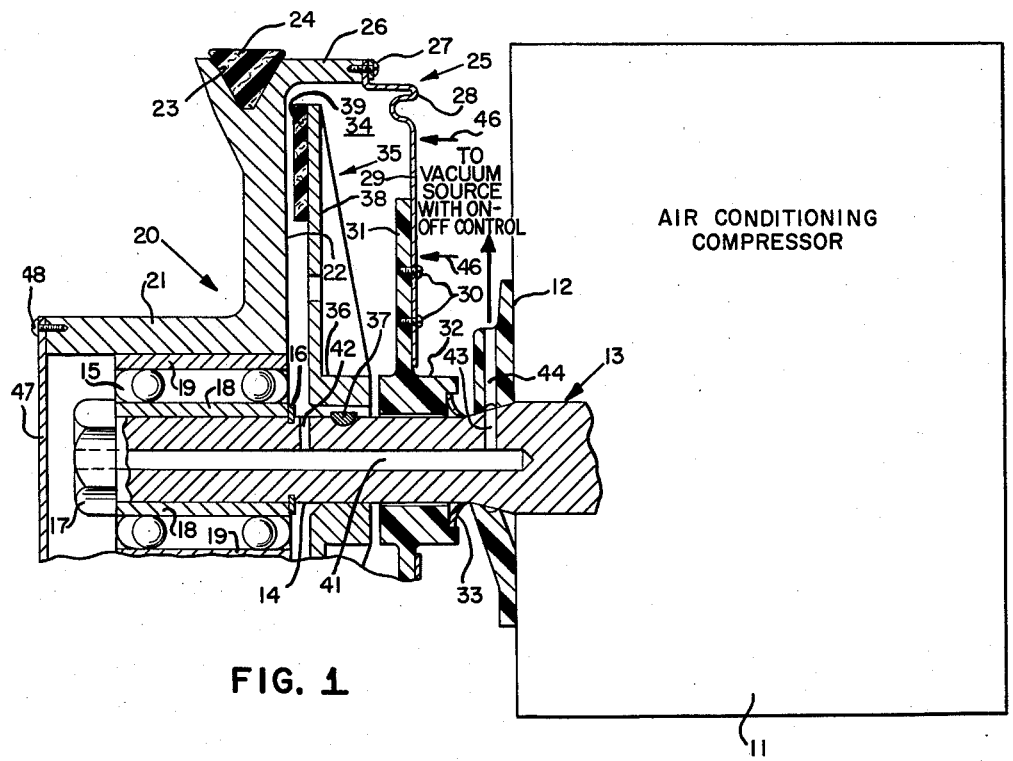
Figure 2:
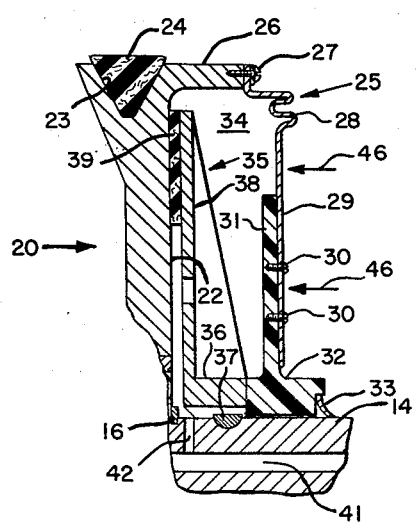
Figure 3:
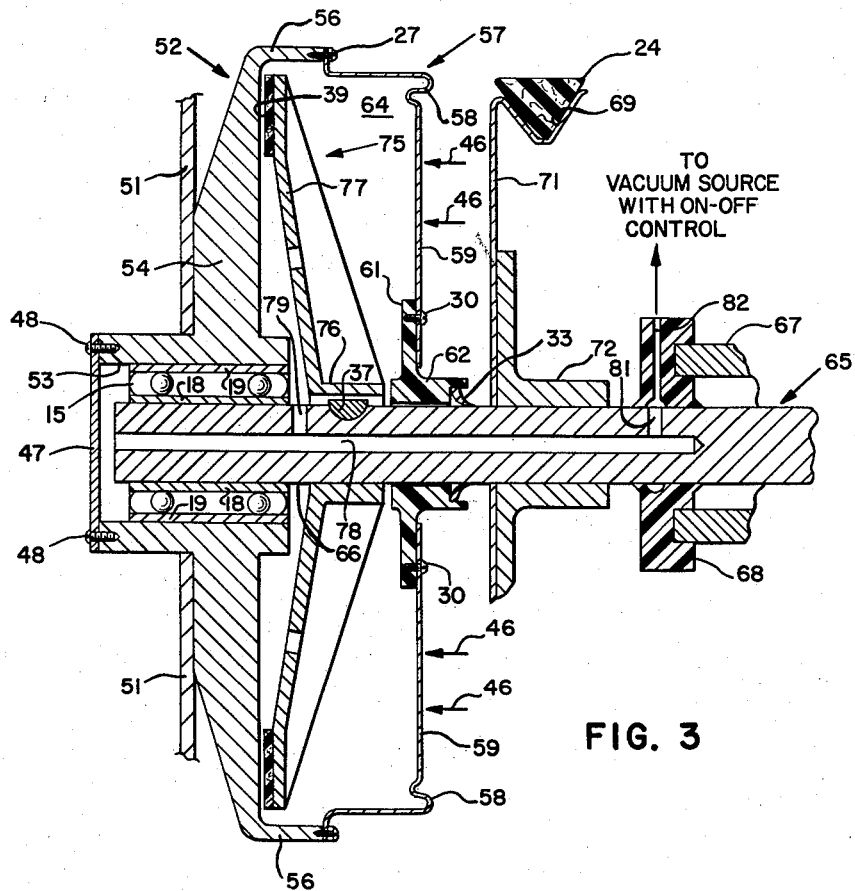

The principles of this invention may be applied readily, for example, to an air conditioning compressor, fan, or other accessory units conventionally driven by the internal combustion engine of an automotive vehicle. The invention will become more apparent when considered in connection with the accompanying drawings, wherein:

FIGURE 1 is a fragmentary view partly in section of a clutch unit made in accordance with this invention and connected to an air conditioning compressor with the clutch in the unapplied condition, and FIGURE 2 is a fragmentary sectional view of the clutch portion shown in FIGURE 1 with the clutch in the driving position, and FIGURE 3 is a cross sectional view similar to FIGURE 1 and showing an alternate form of the invention.

In the embodiment of FIGURES 1 and 2, the driving member is pulley 20 and the driven member is shaft 13. The flexible diaphragm 25 is connected to the pulley 20 or the driving member. Clutch disc 35 is connected to the terminal end portion 14 of shaft 13 and is part of the driven member.

Referring now to the embodiment of FIGURES 1 and 2, an air conditioning compressor is shown schematically at 11 having an apertured front cover 12. The driven member in this embodiment is shaft 13. Shaft 13 extends through the front cover 12 of the air conditioning compressor 11 to define a terminal portion 14. Shaft 13 may be in the form of a crankshaft (not shown) and drives the air conditioning compressor unit 11 in a conventional and well known manner.

A bearing assembly 15 is provided which has a ball guide 18 pressed on the extreme end of the terminal portion 14 of the driven shaft 13. The cup 19 of the bearing 15 is pressed within the hub 21 of the pulley 20. Pulley 20 in this embodiment is the driving member. Bearing assembly 15 may be secured against axial movement on the terminal end portion 14 by snap ring 16 and axially bored bolt 17.

Pulley 20 is further provided with a radially extending flange 22 integrally connected to the hub 21 which terminates in V groove 23. A belt 24 is conventionally mounted in the V groove 23 and is mounted in a like groove in a remotely located pulley, such as an internal combustion engine crankshaft mounted pulley (not shown).

Pulley 20 is further provided with an axially extending flange 26 at its peripheral edge adjacent to the V groove 23. A flexible metal diaphragm 25 is connected at its outer edge to the flange 26 by screws 27. The flexible metal diaphragm 25 is provided with one or more radial corrugations 28 inwardly of the diaphragm connection to the flange 26 and a radially extending flange portion 29. Flange portion 29 is secured to flange 31 of hub 32 by a plurality of screws 30. Hub 32 is slidably mounted upon the terminal end portion 14. A lip seal 33 is anchored to the end of the hub 32 and rides upon the terminal end portion 14 for sealing the hub 32 to the terminal end portion 14.

The hub 21 is sealed at its forward end by plate 47 which is secured to the edge of the hub 21 by screws 48. Plate 47, pulley 20, flexible diaphragm 25, hub 32, and lip seal 33 define an expansible fluid chamber 34 about the terminal end portion 14 of the shaft 13.

A clutch disc 35 is also mounted upon the terminal end portion 14. Clutch disc 35 is located in the expansible fluid chamber 34 between the pulley 20 and the hub 32. Hub 36 of the clutch disc 35 is secured by key 37 to the terminal end portion 14 so that they always rotate as a unit. Limited relative axial movement between the hub 36 and the terminal and portion 14 is permitted. A radially extending web 38 is integral with the hub 36 and is provided with a friction pad 39 adjacent to its peripheral edge. Pad 39 is adapted to engage the inside face of the flange 22 of the pulley 20.

The expansible fluid chamber 34 is normally filled with air. The air is evacuated from the expansible fluid chamber 34 through an axially extending passage 41 in the terminal end portion 14. A transverse passage 42 connects the inside of the fluid expansible chamber 34, adjacent to the clutch disc 35, with axially extending passage 41. An additional transverse passage 43 connects axially extending passage 41 with another passage 44 in the front cover 12. Passage 44 is open to a source of vacuum such as the intake manifold of an internal combustion engine. It is also contemplated that an on-off control will be provided that will selectively shut off the source of vacuum and open the passage 44 and consequently the fluid expansible chamber 34 to atmosphere.

The operation of the device is simple. Upon the evacuation of the air from the expansible fluid chamber 34 through the passages 42, 41, 43 and 44, atmospheric pressure causes the flexible diaphragm 25 to flex and move in the direction of the arrows indicated at 46. Hub 32 therefore will engage the hub 36 of the clutch disc 35 and move the clutch disc 35 axially on the terminal end portion 14. The movement results in the friction pad 39 engaging the inside face of the flange 22 of pulley 20. When this takes place, the driving torque from the belt 24 is transmitted through the pulley 20, through the friction pad 39 and the clutch disc 35, and through the shaft 13 which operates the air conditioning compressor 11.

The air conditioning compressor 11 will continue to operate as long as the expansible fluid chamber 34 remains evacuated of air. When the vacuum source is cut off and the passage 44 opened to atmosphere, the fluid expansible chamber 34 will fill with air.

Corrugations 28 will spring load the diaphragm 25 when flexed inwardly by atmospheric pressure. Upon the return of atmospheric pressure in the expansible fluid chamber 34, the inherent spring action of diaphragm 25 will move it axially away from the clutch disc 35 to interrupt the flow of torque from the pulley 20 to the shaft 13.

In the embodiment of FIGURE 3, a different arrangement is provided to drive an internal combustion engine fan. The driving member is the shaft 65 and the driven member is wheel 52 to which is secured fan 51. The flexible metal diaphragm 57 is connected to the wheel 52 or the driven member, and the clutch disc 75 is connected to the terminal end portion 66 of shaft 65 and is part of the driving member.

Referring now in detail to FIGURE 3, a fan 51 is shown in part and is secured on the hub 53 of a wheel 52. Wheel 52 constitutes the driven member in this embodiment.

Wheel 52 is provided with a radially extending flange 54 integrally connected to the hub 53. Radially extending flange 54 is bent near its peripheral edge to form an axially extending flange 56.

A flexible metal diaphragm 57, which is similar in operation and structure to the diaphragm 25 of FIGURES 1 and 2, has an edge portion connected to the flange 56 by screws 27. The diaphragm 57 is provided with one or more radial corrugations 58 inwardly of the diaphragm connected to the flange 56 and a radially extending flange 59 inwardly of the corrugations 58. Flange 59 is secured to flange 61 of hub 62 by a plurality of screws 30. A lip seal 33 is anchored to the end of the hub 62 and rides against the terminal end portion 66 of the shaft 65.

Shaft 65 constitutes the driving member of this embodiment. It extends through an apertured front cover 68 into a water pump housing 67 shown in part and drives the water pump which is not shown.

Wheel 52 rotates on bearing assembly 15 which has a ball guide 18 pressed on the extreme end of the terminal end portion 66 of the shaft 65. The cup 19 of the bearing 15 is pressed in the hub 53 of the wheel 52. The forward end of the hub 53 is enclosed by a plate 47 which is secured to the edge of the hub 53 by screws 48. Plate 47, wheel 52, flexible diaphragm 57, hub 62, and lip seal 33 define an expansible fluid chamber 64 about the terminal end portion 66 of the shaft 65.

Shaft 65 is constantly driven by means of a belt 24 positioned in a V groove 69 of pulley 71. Pulley 71 is secured to a hub 72 which is securely mounted on the terminal end portion 66 of the shaft 65.

A clutch disc 75 is mounted upon the terminal portion 66 of the shaft 65 within the expansible fluid chamber 64 between the hub 53 of the wheel 52 and the hub 62. Hub 76 of the clutch disc 75 is secured by key 37 to the terminal end portion 66 so that they will rotate as a unit. Limited relative axial movement is permitted however between the hub 76 and the terminal end portion 66. A substantially radially extending web 77 is integral with the hub 76 and is provided with a friction pad 39 adjacent to its peripheral edge. Friction pad 39 is adapted to engage the inside face of the flange 54 of the wheel 52.

The expansible fluid chamber 64 is likewise normally filled with air. The air is evacuated from the expansible fluid chamber 64 through an axially extending passage 78 in the terminal end portion 66. Transverse passage 79 connects the inside of the expansible fluid chamber 64 adjacent to the clutch disc 75 with axially extending passage 78. An additional transverse passage 81 connects axially extending passage 78 with another passage 82 in the front cover 68.

Passage 82 is open to a source of vacuum such as the intake manifold of an internal combustion engine. Similarly to the embodiment of FIGURES 1 and 2, it is also contemplated that an on-off control will be provided that will selectively shut off the source of vacuum and open the passage 82 and ultimately the fluid expansible chamber 64 to atmosphere.

The operation of this embodiment is likewise simple. Upon the evacuation of air from the fluid expansible chamber 64 through the passages 79, 78, 81 and 82, atmospheric pressure causes the flexible diaphragm 57 to flex and move in the direction of the arrows indicated at 46. Hub 62 will engage the hub 76 of the clutch disc 75 and move the clutch disc 75 axially on the terminal end portion 66 of the shaft 65. The friction pad 39 will then engage the inside face of the flange 54 of the wheel 52. When this takes place, the driving torque from the belt 24 is transmitted through the pulley 71 and hub 72 to the shaft 65, through the clutch disc 75, and through wheel 52. Wheel 52, of course, operates the fan 51.

When the vacuum source is cut off and the passage 82 opened to atmosphere, the fluid expansible chamber 64 will fill with air. Spring loaded corrugations 58 will urge the diaphragm 57 axially away from the clutch disc 75 to interrupt the flow of torque from the clutch disc 75 to the wheel 52.

Although the invention has been disclosed for use with internal combustion engine driven accessories, it is to be understood that this invention is not to be so restricted. It further will be understood that the invention is not to be limited to the exact construction shown and described but that various changes and modifications may be made without departing from the spirit and scope of the invention as defined in the appended claims.

I claim:
1. A torque establishing device comprising a first member having an axially extending flange portion, a second member spaced radially inwardly of said flange portion and positioned axially between the ends of said flange portion, means supporting said first and second members for relative rotation, said first member further including a flexible diaphragm secured around its periphery to said flange portion at one end thereof adjacent said second member, means for sealing said first member to form an expansible fluid tight chamber enclosing said second member, and means for varying the fluid pressure within the chamber of said first member for deforming said diaphragm into axial engagement with said second member to create a torque establishing relationship between said first and second members.

2. A torque establishing device comprising a first member having an axially extending flange portion, a second member spaced radially inwardly of said flange portion and positioned axially between the ends of said flange portion, means supporting said first and second members for relative rotation, said first member further including a flexible diaphragm secured around its periphery to said flange portion at one end thereof adjacent said second member, said flexible diaphragm being formed of a readily deformable elastic material biassed by its own resilience in a first axial direction, means for sealing said first member to form an expansible fluid tight chamber enclosing said second member, and means for varying the fluid pressure within the chamber of said first member for deforming said diaphragm in a second axial direction, said diaphragm being adapted to engage said second member upon axial movement in one direction to create a torque establishing relationship between said first and second members.

3. A torque establishing device comprising a first member having an axially extending flange portion, a second member spaced radially inwardly of said flange portion and positioned axially between the ends of said flange portion, means supporting said first and second members for relative rotation, said first member further including a flexible diaphragm secured around its periphery to said flange portion at one end thereof adjacent said second member, said diaphragm being formed of an elastic material and having at least one corrugation formed therein to increase its resilience, means for sealing said first member to form an expansible fluid tight chamber enclosing said second member, and means for varying the fluid pressure within the chamber of said first member for deforming said diaphragm into engagement with said second member to create a torque establishing relationship between said first and second members, the resilience of said diaphragm being operative to cause said diaphragm to return to its unstressed position upon the return of normal pressure in said chamber to disengage the torque establishing relationship between said first and second members.

4. A fluid operated clutch comprising a first member having a clutch face terminating in an axially extending flange portion, a second member having a clutch face juxtaposed to the clutch face of said first member and axially movable with respect thereto, a flexible diaphragm secured around its periphery to the flange portion of said first member adjacent said second member, means for sealing said first member to form with said flexible diaphragm an expansible fluid tight chamber enclosing said second member, said diaphragm being formed of an elastic material biased by its resilience away from engagement with said second member, and means for evacuating said chamber for causing the external pressure on said chamber to deform said diaphragm into engagement with said second member to axially move said second member and bring the clutch faces of said first and second members into engagement.

5. A clutch for driving an accessory of an internal combustion engine comprising a first member having a clutch face terminating in an axially extending flange portion, a second member having a clutch face juxtaposed to the clutch face of said first member and axially movable with respect thereto, a flexible diaphragm secured around its periphery to the flange portion of said first member adjacent said second member, means for sealing said first member to form with said flexible diaphragm an expansible fluid tight chamber enclosing said second member, said diaphragm having a hub portion adapted to engage said second member for moving said second member axially to cause engagement of said clutch faces, one of said members being adapted to be driven by the crankshaft of the engine and the other of said members being adapted to drive the engine accessory, and conduit means including control means adapted to interconnect said chamber with the induction system of the engine for utilizing engine suction to exhaust said chamber and actuate the clutch.

6. A clutch for driving an accessory of an internal combustion engine comprising a first member having a clutch face terminating in an axially extending flange portion, a second member having a clutch face juxtaposed to the clutch face of said first member and axially movable with respect thereto, a flexible diaphragm secured around its periphery to the flange portion of said first member adjacent said second member, means for sealing said first member to form with said flexible diaphragm an expansible fluid tight chamber enclosing said second member, said diaphragm being formed of an elastic material biased by its resilience away from said first member, said diaphragm having a hub portion adapted to engage said second member for moving said second member axially to cause engagement of said clutch faces, one of said members being adapted to be driven by the crankshaft of the engine and the other of said members being adapted to drive the engine accessory, and conduit means including control means adapted to interconnect said chamber with the induction system of the engine for utilizing engine suction to exhaust said chamber and actuate the clutch.

7. A clutch for driving an accessory of an internal combustion engine comprising a first member having a clutch face terminating in an axially extending flange portion, a second member having a clutch face juxtaposed to the clutch face of said first member and axially movable with respect thereto, a flexible diaphragm secured around its periphery to the flange portion of said first member adjacent said second member, means for sealing said first member to form with said flexible diaphragm an expansible fluid tight chamber enclosing said second member, said diaphragm being formed of an elastic material biased by its resilience away from said first member, said diaphragm further having at least one corrugation formed therein adjacent the flange portion of said first member to increase the resilience of said diaphragm, said diaphragm having a hub portion adapted to engage said second member for moving said second member axially to cause engagement of said clutch faces, one of said members being adapted to be driven by the crankshaft of the engine and the other of said members being adapted to drive the engine accessory, and conduit means including control means adapted to interconnect said chamber with the induction system of the engine for utilizing engine suction to exhaust said chamber and actuate the clutch.

References Cited by the Examiner

UNITED STATES PATENTS

| | | | |
|---|---|---|---|
| 1,759,755 | 5/30 | Lindner | 192—88 |
| 2,005,468 | 6/35 | Modine. | |
| 2,043,239 | 6/36 | Curtis | 192—85 |
| 2,138,393 | 11/38 | Wichtendahl | 192—88 |
| 2,307,619 | 1/43 | Brewer | 192—85 |
| 2,338,693 | 1/44 | Dolan | 192—85 |
| 2,483,521 | 10/49 | Blanchette | 192—87 |
| 2,809,308 | 10/57 | Turner | 192—88 |
| 2,998,206 | 8/61 | Pendleton | 192—85 |
| 3,151,717 | 10/64 | Kaptur et al. | 192—3.2 |

DAVID J. WILLIAMOWSKY, *Primary Examiner.*

THOMAS J. HICKEY, *Examiner.*